United States Patent
Munier et al.

(10) Patent No.: US 9,692,235 B2
(45) Date of Patent: Jun. 27, 2017

(54) MANAGING CONTINUITY OF THE SUPPLY OF POWER TO ELECTRIC EQUIPMENT

(75) Inventors: Eric Munier, Montigny le Brettoneux (FR); Jean-Marie Bourgeais, Saint Forget (FR); Marion De Gentile, Clamart (FR)

(73) Assignee: POWIDIAN, Chambray les Tours (FR)

( * ) Notice: Subject to any disclaimer, the term of this patent is extended or adjusted under 35 U.S.C. 154(b) by 564 days.

(21) Appl. No.: 14/005,588

(22) PCT Filed: Mar. 9, 2012

(86) PCT No.: PCT/EP2012/054091
§ 371 (c)(1),
(2), (4) Date: Oct. 4, 2013

(87) PCT Pub. No.: WO2012/123350
PCT Pub. Date: Sep. 20, 2012

(65) Prior Publication Data
US 2014/0021785 A1  Jan. 23, 2014

(30) Foreign Application Priority Data
Mar. 17, 2011 (FR) .................................. 11 52219

(51) Int. Cl.
*H02J 4/00* (2006.01)
*H02J 3/28* (2006.01)
(Continued)

(52) U.S. Cl.
CPC ............ *H02J 4/00* (2013.01); *H02J 1/102* (2013.01); *H02J 3/28* (2013.01); *H02J 3/32* (2013.01);
(Continued)

(58) Field of Classification Search
CPC .... H02J 4/00; H02J 3/386; H02J 3/383; H02J 15/00; H02J 3/387; H02J 3/28; H02J 3/32;
(Continued)

(56) References Cited

U.S. PATENT DOCUMENTS 6,674,263 B2 * 1/2004 Agbossou ......... H01M 8/04992
307/151
7,233,079 B1 * 6/2007 Cooper ................... F03D 9/021
290/44
(Continued)

*Primary Examiner* — Jared Fureman
*Assistant Examiner* — Michael Warmflash
(74) *Attorney, Agent, or Firm* — Steven M. Greenberg, Esq.; CRGO Law

(57) ABSTRACT

The supply of an electric equipment material (5), such as a telecommunications station, is implemented in priority by an intermittent power source (6), and makes use as much as possible of batteries (31) and as little use as possible of a fuel cell electrochemical generating unit (4) for increasing the life of the latter. The equipment and the generating unit are supplied by the source so as to produce and stock fuel in the generating unit when the power of the source exceeds the operation power of the equipment and the batteries are in full charge. Destocking the fuel in the generating unit, supplying the equipment by the generating unit and charging the batteries by the generating unit are carried out as soon as the power of the batteries is at a discharge threshold and until the batteries reach the full charge.

15 Claims, 3 Drawing Sheets

(51) Int. Cl.
*H02J 3/32* (2006.01)
*H02J 3/38* (2006.01)
*H02J 15/00* (2006.01)
*H02J 1/10* (2006.01)
*H02J 1/00* (2006.01)
*H02J 7/34* (2006.01)

(52) U.S. Cl.
CPC .............. *H02J 3/383* (2013.01); *H02J 3/386* (2013.01); *H02J 3/387* (2013.01); *H02J 15/00* (2013.01); *H02J 7/34* (2013.01); *H02J 2001/004* (2013.01); *Y02E 10/563* (2013.01); *Y02E 10/566* (2013.01); *Y02E 10/763* (2013.01); *Y02E 70/30* (2013.01); *Y10T 307/359* (2015.04)

(58) Field of Classification Search
CPC ............ H02J 2001/004; Y10T 307/359; Y02E 10/763; Y02E 10/566; Y02E 10/563; Y02E 70/30
USPC .......................................................... 307/82
See application file for complete search history.

(56) References Cited

U.S. PATENT DOCUMENTS

| | | | |
|---|---|---|---|
| 7,245,039 B2* | 7/2007 | DuHamel | F03D 3/0427 290/44 |
| 7,992,409 B1* | 8/2011 | Cooper | B01D 53/002 290/44 |
| 2002/0084655 A1* | 7/2002 | Lof | F03D 7/0284 290/44 |
| 2002/0103745 A1* | 8/2002 | Lof | F03D 9/005 705/37 |
| 2003/0207161 A1* | 11/2003 | Rusta-Sallehy | H01M 8/065 429/410 |
| 2003/0227276 A1* | 12/2003 | Agbossou | H01M 8/04992 320/112 |
| 2005/0184594 A1* | 8/2005 | Fredette | H01M 16/003 307/78 |
| 2005/0273280 A1* | 12/2005 | Cox | G01R 21/133 702/60 |
| 2009/0048716 A1* | 2/2009 | Marhoefer | H01M 8/0612 700/291 |
| 2009/0076661 A1* | 3/2009 | Pearson | H01M 8/04619 700/291 |

* cited by examiner

MANAGING CONTINUITY OF THE SUPPLY OF POWER TO ELECTRIC EQUIPMENT

CROSS-REFERENCE TO RELATED APPLICATIONS

This application is a §371 national phase entry of International Application No. PCT/EP2012/054091, filed Mar. 9, 2012, which claims priority to French Patent Application No. 1152219, filed Mar. 17, 2011.

The present invention relates to an autonomous hybrid electric supplying system for an electric equipment material, in particular a telecommunications station as a base station of a network for mobiles. The electric supplying system may be transportable.

Currently, telecommunications operators are requested for implementing telecommunications networks for mobiles in countries and regions that are not provided with an electric power distribution network. A station in such a telecommunications network should be autonomous for its electrical power consumption and should not require any caretaking. In addition to its autonomy, the station should meet mobility, availability and protection requirements, if it is used for rescue teams upon natural disasters or upon conflicts and/or in isolated areas, and have a small manufacturing cost for making it available to poor regions.

The known autonomous hybrid electric supplying systems only partially meet such requirements. They generally comprise a renewable energy source producing electricity, an electricity stocking module guaranteeing a relative autonomy and an electronic control unit ensuring a relatively permanent electrical supply of the telecommunications station.

The renewable energy source is most often hybrid and comprises several renewable energy cells, such as a wind power generator and photovoltaic sun panels. Such a solution involves drawbacks. For instance, too high a wind turbine pole, the top of which supports the telecommunications station, is not transportable and the station is hardly accessible. According to another example, a lot of wind power stations and/or too big or too numerous sun panels are not appropriate for a transportable supplying system.

The electricity stocking module could comprise a lead-acid electrical battery having the drawbacks of having an excessive size and weight, making its protection difficult in a transportable box, such as a "shelter". Moreover, the lifetime of the battery decreases as the temperature increases on the site where the supplying system is installed, the battery tending to swell under the heat.

The electricity stocking module is most often associated with a power generating plant that could be a diesel generator or a fuel cell. The power generating plant overcomes a discharge of the battery due to renewable energy being insufficient, for instance during periods with no wind and/or sunlight, including at night, during a few days. The power generator is noisy, produces smoke that is noxious to the environment, and is expensive in fuel. It requires a frequent maintenance and involves installing a vessel containing fuel that could be stolen.

In order to overcome the drawbacks of the generator, the latter could be replaced by a fuel cell participating in the continuity of the electric power supply. The fuel of the cell could be methanol or hydrogen. In a methanol fuel cell, the methanol is regenerated so as to produce hydrogen supplying the cell rejecting carbon dioxide gas. The methanol could not be produced on the site and should be stored and refilled. Similarly, the hydrogen of a hydrogen cell should be stored under high pressure in cylinders to be refilled.

The hydrogen could be produced regularly through water electrolysis so as to avoid a fuel refill. In such a case, the hydrogen produced by an electrolysis facility should be compressed under a very high pressure and stored in cylinders on the site, requiring heavy, complex and expensive means incompatible with a transportable supplying system. Moreover, the regulation relative to high pressure hydrogen stocking is restricting and hydrogen stocking should be secured for instance through caretaking. A water supplying source should be provided on the site for the operation of the electrolysis facility.

In order to overcome the drawbacks of hydrogen stocking in cylinders, hydrogen stocking tanks based on a reversible hydridation reaction have been recently developed. However an electrochemical generating unit comprising a hydrogen cell, an electrolysis facility and a hydrogen stocking tank of this type is not water autonomous for the electrolysis facility.

In all the electric supplying systems, the generating units comprising fuel cells have a high cost, a lifetime of a few thousand hours and a low yield.

The invention aims at automatically managing a supplying system of an electric equipment, being able to be supplied equally by an intermittent electric power source, an electric power stocking module and a gaseous fuel electrochemical generating unit, so as to make use as little as possible of an electrochemical generating unit for supplying the equipment and thereby increase the lifetime of the fuel electrochemical generating unit and the autonomy of the supplying system and reduce the maintenance thereof.

To this end, a method for managing the continuity of the electrical supply of an electric equipment material, the method relying on an electric power stocking module and a gaseous fuel electrochemical generating unit, is characterized in that the electrical supply of said electric equipment is provided in priority by an intermittent electric power source and in that it comprises the steps of:

supplying by the equipment source the electric power stocking module and the electrochemical generating unit for producing and stocking fuel in the electrochemical generating unit when the power of the source exceeds the operating power of the equipment and the electric power stocking module is at a first power threshold, such as a full charge threshold, and destocking the fuel in the electrochemical generating unit, supplying the equipment by the electrochemical generating unit and charging the electric power stocking module by the electrochemical generating unit as soon as the power of the electric power stocking module is at a second power threshold being lower than the first threshold and until the electric power stocking module charged by the electrochemical generating unit reaches the first power threshold.

According to the invention, the electrochemical generating unit only produces and stocks fuel if a very particular dual condition is met and corresponds to an intermittent source power exceeding the operation power of the equipment and a power of the electric power stocking module at least equal to the first power threshold, such as a full charge threshold. The electrochemical generating unit is only activated as soon as one very particular condition is met and corresponds to a power of the electric power stocking module comprising at least one battery having reached the second power threshold, such as a discharge threshold. These two conditions enable to make as little use as possible of the fuel electrochemical generating unit and as often as possible of the intermittent source and of the electric power stocking module for supplying the equipment. Indeed, the lifetime of the fuel cell included in the generating unit is independent from the power it delivers, but depends on the number of activations-deactivations of the cell, while a battery included in the electric power stocking module has a long lifetime, up to several years, even if it has been submitted to a very high number of charge and discharge cycles. The above mentioned conditions also decrease the frequency of the maintenance of the supplying system, in particular of the electrochemical generating unit.

The intermittent electric power source may be a renewable energy device or a little reliable power distribution network.

As a complement to the two above mentioned steps, the managing method according to the invention further comprises the following steps to be carried out as long as the electric power stocking module has not reached the second power threshold, and without making use of the energy stored in the electrochemical generating unit and consisting in:

supplying the equipment by the source and charging the electric power stocking module by the intermittent source when the power of the source exceeds the operation power of the equipment and the power of the electric power stocking module is included between the first and the second power thresholds, and supplying the equipment by at least the electric power stocking module when the intermittent source power is lower than the operating power of the equipment and the power of the electric power stocking module is included between the first and the second power thresholds.

In the second step above, the supply of the equipment by at least the electric power stocking module means that the equipment may be supplied by both the electric power stocking module and the intermittent source or only by the electric power stocking module, if the two following conditions are met: the intermittent source power is lower than the operation power of the equipment and hence may be nil, and the power of the electric power stocking module is higher than the second threshold, that is included between the two power thresholds.

Managing the continuity of the electrical supply of the equipment may be automatically carried out by a managing unit for managing the supply of the electrochemical generating unit as a function of the charge of the electric power stocking module. In this case, in order to maintain the autonomy of the supplying system, the supply of the managing unit is simultaneous with the supply of the equipment, the equipment and the managing unit making up the electrical charge of the system the continuity of the electrical supply of which should be guaranteed.

The electrochemical generating unit may be alone or completed by more than another electrochemical generating unit as a function of the capacity of the electric power stocking module and of the desired speed of the recharging of the latter. According to a particular embodiment of the invention using a fuel cell, for instance a hydrogen fuel cell, in each electrochemical generating unit steps may be provided consisting in:

generating fuel by an electrolysis facility and stocking the fuel produced in a stocking tank when the electrolysis facility is supplied by the source, and destocking the fuel from the stocking tank in a fuel cell as soon as the power of the electric power stocking module is at the second power threshold and until the power of the electric power stocking module supplied by the cell reaches the first power threshold.

According to another characteristic of the invention, the autonomy in water to be supplied to the electrolysis facility is ensured by a condensation of steam from outside air into condensation water while hydrogen is destocked. Hydrogen stocking may comprise an adsorption of hydrogen by an alloy so as to form a hydride, and the condensation may result from a transfer of heat in the air charged with steam to an endothermic reaction of the hydride into an alloy.

The invention also relates to a managing unit for managing the continuity of the supply of an electric equipment material able to be supplied in priority by an intermittent electric power source, the equipment being able to be supplied moreover by an electric power stocking module and a gaseous fuel electrochemical generating unit. The managing unit is characterized in that it comprises the following means in relationship with the above mentioned very particular conditions:

a means for supplying by the source the equipment, the electric power stocking module and the electrochemical generating unit so as to produce and stock fuel in the electrochemical generating unit when the source is able to have a power exceeding the operation power of the equipment and the power of the electric power stocking module is able to have a power being at least equal to a first power threshold, and a means for destocking fuel in the electrochemical generating unit, supplying the equipment by the electrochemical generating unit and charging the electric power stocking module by the electrochemical generating unit as soon as the electric power stocking module is able to have a power being equal to a second power threshold lower than the first threshold and until the electric power stocking module charged by the electrochemical generating unit is able to reach the first power threshold.

In order that the functions of these means are controlled by a controlling means of the programmable controller type, the managing unit may comprise switches connected to the source and to the electrochemical generating unit, current converters connected to the electric power stocking module, to the equipment and to the electrochemical generating unit. The control means may be able to control the switches and the converters so that the electrochemical generating unit is able to supply the equipment and the electric power stocking module as soon as the electric power stocking module is able to have a power being equal to the second power threshold and until the electric power stocking module charged by the electrochemical generating unit is able to reach the first power threshold, and so that at least the electric power stocking module is able to supply the equipment when the intermittent source is able to have a power being lower than the operation power of the equipment and the electric power stocking module is able to have a power included between the first and le second power thresholds.

In order to meet the above mentioned conditions, being able to depend on measurements of various electrical powers, the managing unit according to the invention may still comprise a means for measuring the power supplied by the source, a means for measuring the power supplied by the electrochemical generating unit when the electrochemical generating unit is able to charge the electric power stocking module, a means for piloting the supplying voltage of an electrolysis facility included in the electrochemical generating unit, a means for measuring the operation power of the equipment, and a means for measuring the power of the electric power stocking module.

The invention also relates to a system for supplying an electric equipment material under the control of the managing unit according to this invention. The system comprises the intermittent electric power source, the electric power stocking module and the gaseous fuel electrochemical generating unit, and is characterized in that the intermittent source is a renewable energy source able to comprise one or more wind power generators and/or one or more photovoltaic sun panels.

According to another embodiment, the system comprises the electric power stocking module and the gaseous fuel electrochemical generating unit, and is characterized in that the intermittent source is an electric power distribution network. For such embodiment, the system operates as an emergency supplying system when the distribution network is switched off or when the power delivered by the latter is abnormally too low for supplying the equipment.

In these two embodiments, the electric supplying system may be fully autonomous in electricity, fuel and water, silent, not polluting and modulable, have a lifetime of at least about fifteen years and require little maintenance.

In order to increase the lifetime of the system, the electric power stocking module may comprise at least one lithium-ion battery.

When the electrochemical generating unit comprises a fuel cell, the fuel cell is able to supply the equipment and to charge the electric power stocking module as soon as the electric power stocking module is able to have a power being equal to the second power threshold and until the electric power stocking module charged by the electrochemical generating unit is able to reach the first power threshold. No fuel refill is necessary when the electrochemical generating unit also comprises an electrolysis facility for producing fuel when the source is able to have a power exceeding the operating power of the equipment and the electric power stocking module is able to have a power being at least equal to the first power threshold, and a stocking tank for stocking fuel produced by the electrolysis facility and destocking fuel in the cell.

If the fuel is hydrogen, the electrochemical generating unit may comprise a condenser for condensing steam from outside air into condensation water while destocking hydrogen from the stocking tank in the cell and a water collector-tank for collecting the condensation water while destocking hydrogen and supplying the condensation water to the electrolysis facility when the electrolysis facility is able to be supplied by the source. Depending on the climatic conditions of the installation site of the system, the condenser may be able to condense the steam supplied by the cell.

Finally, the invention is related to a computer program able to be implemented in a managing unit according to this invention. The program is characterized in that it comprises instructions that, when the program is carried out in the managing unit, implement the method of the invention.

Additional characteristics and advantages of the present invention shall become readily apparent from reading the description that follows of several embodiments of this invention, given as non limitative examples, with reference to the accompanying drawings, wherein.

Figure 1:
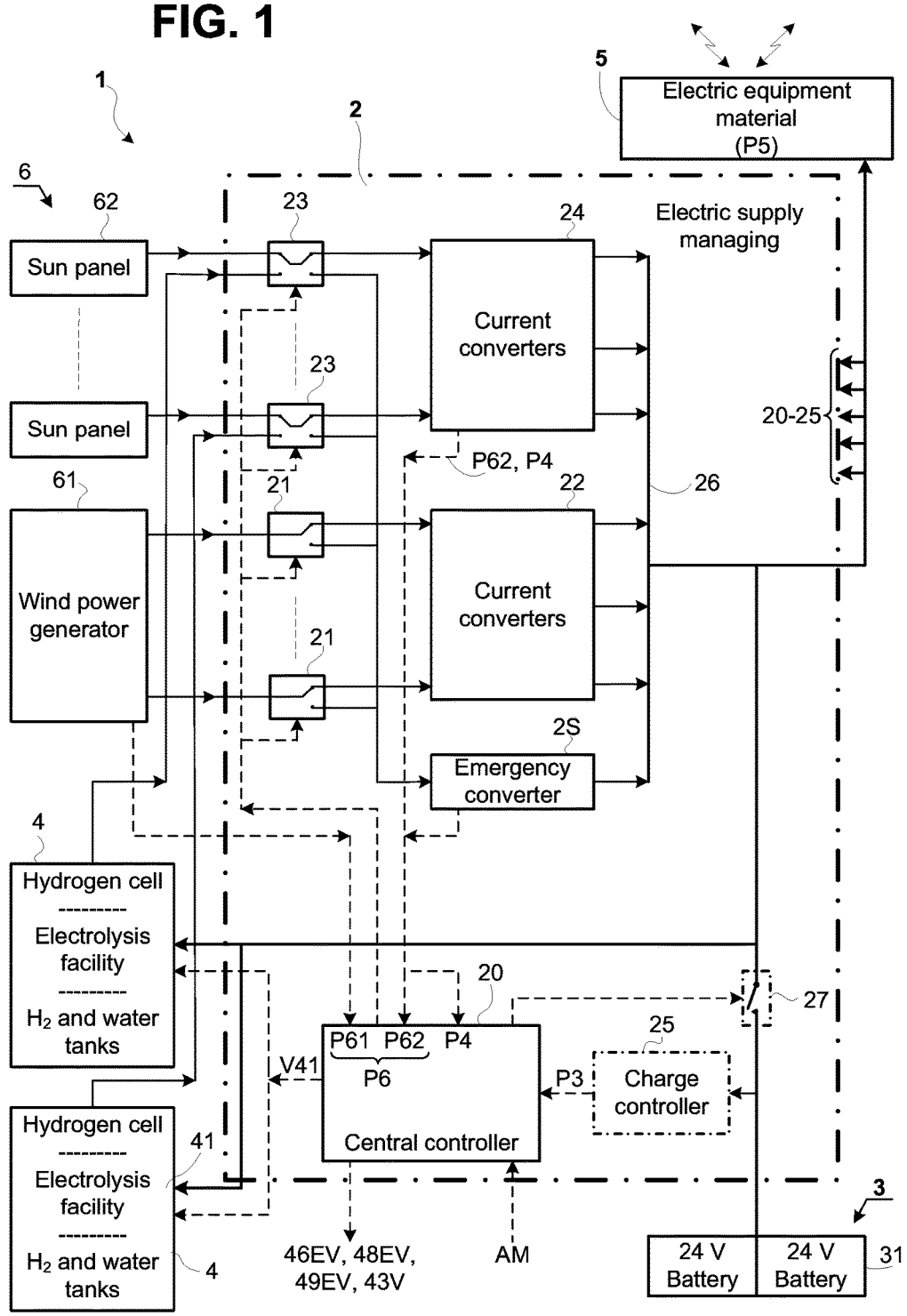
FIG. 1 is a schematic block-diagram of an electrical supplying system according to this invention.

With reference to FIG. 1, an electric supplying system 1 according to this invention comprises an electric supplying managing unit 2, an electric power stocking module 3 and at least one gaseous fuel electrochemical generating unit 4, for instance two electrochemical generating units. The system 1 is adapted to supply an electrical equipment material 5 with electrical power and to be connected to an intermittent electric power source 6.

The electric equipment 5 operates as the electrical charge of the supplying system and is for instance a telecommunications station operating in emitter and receiver for mobile terminals. The equipment 5 is permanently supplied by the supplying system 1 with an operation electrical power P5 varying as a function of the services provided by the equipment. For instance, the equipment is supplied under a continuous voltage of 48V corresponding to the nominal voltage in outlet of the electric power stocking module 3.

According to a first use illustrated on FIG. 1, to which reference will be made hereinafter, the intermittent power source 6 is a renewable energy device comprising for instance a wind power module and a sun energy module. The wind power module comprises for instance at least one wind power generator 61 for generating an intermittent alternating three-phase outlet current according to the embodiment on FIG. 1, or an intermittent direct current. The sun energy module comprises at least one photovoltaic sun panel 62. For instance two or three photovoltaic sun panels 62 are connected in parallel to the unit 2. The sun panels generate an intermittent direct current.

Globally, the power source 6 is able to supply a recoverable power P6 varying as a function of the geographical position of the installation site of the system 1.

The electric power stocking module 3 comprises electric batteries 31 and has for instance a nominal voltage of 48V. The batteries are, for instance, of the lithium-ion type so as to offer a lifetime of several years for a large number of charge-discharge cycles. The capacity of the batteries is such that the charge-discharge cycle takes approximately 24 hours when they permanently supply the equipment 5. They deliver a permanently measured power P3 ranging between a minimum charge power P3$m$, referred to as the discharge power, and a maximum charge power P3M referred to as the full charge power. The batteries are charged by the power source 6 during periods with sufficient wind and/or sunlight and operate as a buffer during periods with no wind and/or sun on the site where the system 1 is installed, so as to supply the equipment 5 with the electrical power as long as the power P3 has not reached the discharge power P3$m$. The discharge power P3$m$ is sufficient for supplying the managing unit 2 and the equipment 5 and for starting the cells in the electrochemical generating units 4 according to the cycle of the method for managing said supplying system 1 to be described hereinunder. During long periods with no wind and sun, being higher than approximately 24 hours and able to be as long as more than 10 days, the electrochemical generating units 4 are activated by the managing unit 2 each time the power P3 reaches the discharge power P3$m$ in order to rapidly recharge the batteries 31, typically in approximately 3 hours. The units 4 also ensure the supply in electrical power of the equipment 5 while the batteries are being recharged, or should the latter be deficient.

According to the embodiment of the supplying system as shown on FIG. 1, the two electrochemical generating units 4 are identical and have hydrogen as fuel. One of them is described hereinafter with reference to FIG. 2.

Each electrochemical generating unit 4 comprises as modules, a hydrogen cell 40, an electrolysis facility 41, a hydrogen stocking tank 42, a condenser 43 and a water tank-collector 44 and a water purifier 45. Alternatively, a hydrogen stocking tank, a condenser, a water tank-collector and a water purifier are common to the units 4, each comprising an individual electrolysis facility 41 and an individual hydrogen cell 40.

The hydrogen cell 40 is based, for instance, on the PEM ("Proton Exchange Membrane") technology. The hydrogen as dihydrogen is discharged from the hydrogen stocking module 42 via a line 46 with a solenoid valve 46EV opened under the control of the managing unit 2, to be oxidized at the anode 40A of the cell. The oxygen coming from the ambient air is thus reduced on the cathode 40C of the cell with an ion exchange for supplying electric current in outlet of the cell 40 and air charged with steam in a line 47P being able, according to an alternative, to be connected with the condenser 43. In operation, the hydrogen cell 40 rapidly supplies a much higher power than the electrical power P5 necessary for the operation of the electric equipment 5.

Under the control of the managing unit 2, the electrolysis facility 41 is supplied with electricity by the source 6 and with water by the collector 44 through a line 48 having a solenoid valve 48EV opened under the control of the managing unit 2, and through the water purifier 45. The electrolysis facility operates at low pressure and low temperature so as to break down the water being collected and purified into oxygen and hydrogen. At the anode 41A of the electrolysis facility, the oxygen escapes in the air. At the cathode 41C of the electrolysis facility, hydrogen is produced under a low pressure so as to be stocked in the tank 42 via a line 49 having a solenoid valve 49EV opened under the control of the managing unit 2. For instance, the electrolysis facility 41 is compact and comprises a solid state electrolyte as a polymeric membrane PEM. The electrolysis of water is triggered in the electrolysis facility 41 by a supply of electricity in outlet of the managing unit 2 managing the duration of the electrolysis and the opening of the solenoid valves 48EV and 49EV until the hydrogen stocking tank 42 is full.

The hydrogen stocking tank 42 and the steam condenser 43 preferably have the form of at least one container.

The tank 42 contains boxes 42C, which may have the form of cylinders and being stacked vertically according to the illustrated embodiment. Each box 42C has a stocking inlet 42S connected to the line 49 for stocking directly the hydrogen produced by the cathode 41C of the electrolysis facility 41 and a destocking outlet 42D connected to the line 46 for destocking the hydrogen directly towards the anode 40A of the cell 40. Alternatively, the inlet 42S and the outlet 42D are gathered into one single stocking/destocking mouth of the box.

The condenser 43 has for instance the form of a hollow metallic column, having in the high part an air intake inlet 43AE for admitting the ambient air 47E external to the generating unit, and in the low part an air exhaust outlet 43S outside and a condensation water recovery outlet 43EC directed towards the water tank-collector 44. The condenser 43 contains a forced convection system and a heat exchanger. The convection system for instance comprises an electric fan 43V controlled by the managing unit 2 and arranged in the high part ahead the air inlet 43AE. The heat exchanger has for instance the form of a radiator 43R having fins oriented toward the interior of the condenser 43 so as to be in contact with the ventilated air and a base making up a thermally conductive wall, for instance made in graphite, common to the condenser and to the boxes 42C of the stocking tank 42.

The water tank-collector 44 comprises a vessel for collecting through gravity condensation water 43EC being produced by the condenser 43. Optionally, the collector 44 collects rain water 44$p$. The collector 44 is connected via the line 48, the solenoid 48EV of which is opened under the control of the managing unit 2 for supplying water to the purifier 45 and the electrolysis facility 41 when the latter is electrically supplied by the intermittent source 6 for producing the hydrogen to be stocked. The purifier 45 purifies the water being collected for meeting the water quality required by the electrolysis facility 41.

The hydrogen stocking tank 42 stocks directly the hydrogen produced by the electrolysis facility 41 and supplies directly hydrogen as an energetic vector to the hydrogen cell 40. The tank 42 is charged with the hydrogen produced at low pressure typically of about ten bars by the electrolysis facility 41 via the solenoid valve 49EV opened under the control of the managing unit 2 in the line 49. Each box 42C in the tank 42 contains a rare earth and metal basic alloy, such as an alloy of lanthane and nickel, in contact with the base of the radiator 43R.

Upon stocking hydrogen being exothermic, the alloy having a high reversible mass adsorption capacity adsorbs the hydrogen produced by the electrolysis facility 41 so as to form a hydride substrate, such as the hydride $LaNi_5H_6$, with heat being evolved outside. This direct stocking of the hydrogen being produced is not based on a compression of several hundreds of bars of the hydrogen as for stocking gaseous or liquid hydrogen in cylinders and has a very high energetic yield.

The hydridation reaction being reversible, the tank 42 destocks the hydrogen stocked through desorption by means of a transfer of the heat supplied by the air 47E admitted in the condenser 43 upon the endothermic reaction converting the hydride into an alloy and hydrogen. The hydrogen is destocked under a lower destocking pressure and under a higher temperature via the discharge line 46 with the solenoid valve 46EV opened by the managing unit 2. The destocking pressure of a few bars is lower than stocking hydrogen pressure and substantially higher than the atmospheric pressure and corresponds to the pressure of the cell 40. The metal then switches from the hydride state to its original state ready to stock the hydrogen produced again. For destocking hydrogen, the fan 43V is started by the managing unit 2 so that the amount of heat necessary for desorption is supplied by the quite wet outside air 47E. The air 43F forced by the fan 43V in the condenser 43, for instance with a flow rate of approximately 1 $m^3/s$, cools down upon the contact with the fins of the radiator 43R from which the hydride takes any heat necessary for endothermic hydrogen destocking.

While the air forced 43F in the condenser is cooled down during the heat exchange with the hydride via the radiator 43R, the temperature of the air switches to a temperature of approximately 1° C., higher than the dew temperature of the air, without the condensation water reaches the freezing temperature and freezes, so as to convert the saturated steam into liquid water 43EC being recoverable by the collector 44. A controller 20 in the managing unit 2 is connected to a thermometer in the condenser 43 so as to check that the temperature at the surface of the radiator 43R does not reach 0° C.

The tank 42 and the condenser 43 are dimensioned so that the condenser supplies enough water to the electrolysis facility via the purifier 45 and so that the electrolysis facility supplies enough hydrogen to stock, so that the cell 40 rapidly supplies electrical power to the batteries 31 to be recharged typically in a few hours, while supplying the equipment 5. Cyclically under the control of the managing unit 2, the batteries 31 are charged rapidly by the cell 40, and discharge slowly so as to supply the equipment 5 during a long period without wind and without sunlight, for instance of 10 days approximately, and thus while the intermittent power source 6 is inactive. The amount of heat tapped by the stocking tank 42 exceeds the water needs of the electrolysis facility for the production of hydrogen necessary for the operation of the cell while the batteries are recharged from the discharge power P3m to the full charge power P3M. For instance, while hydrogen is destocked, 3 liters of condensation water approximately may be produced within only approximately 60 minutes and will be used for the production of 3.75 $Nm^3$ (Normal Cubic Meter) of hydrogen by the electrolysis facility. The hydrogen consumption of the cell for 4 kW in 3 hr is approximately 11 $Nm^3$ and allows the generation of 9 liters of condensation water approximately as well as the production of 12 kWh for rapidly recharging the batteries.

Alternatively, if the hygrometry and/or the temperature of the air on the installation site of the system 1 are too low or become too low, the heat supplied by the outside air 47E and to be tapped by the tank 42 via the radiator 43R while destocking may be supplemented with the flow of hot air 47P charged with steam, evolved by the chemical reaction in the cell 40 being in service upon destocking. In such an alternative, the hot air 47P charged with steam is brought from the cell 40 via a line to an intake input 43AP of the condenser 43 before the fan 43V. The steam produced by the operation of the hydrogen cell 40 does not supply enough condensation water 43EC for a supply of hydrogen in the tank 42 produced by the electrolysis facility 41 to be sufficient to the production of electricity of the cell 40 necessary for recharging batteries 31. A renewable water supply, upon the yearly maintenance of the unit 4 may be provided for this alternative.

Turning back to FIG. 1, the managing unit 2 is organized around a central controller 20 and further comprises switches 21 and 23, current converters 22 and 24 and a charge controller 25 connected to the central controller 20. Outlets of each converter 22, 24 are connected by a bifilar bus 26 of 48 volts or by an electrical distribution bar; to the members 20 to 25 included in the managing unit, to the electric power stocking module 3, to the electrical equipment 5 and to the electrochemical generating units 4. Each current converter 22, 24 is programmable so as to be adapted to alternating or direct currents in outlet of the wind power generator 61 and of the sun panels 62, and includes a charge regulator piloted by the central controller 20 so as to regulate the current consumption of the equipment 5, of the batteries 31 and of the electrolysis facilities 41 in the units 4. The numbers of converters 22 and 24 depend respectively on maximum powers of the wind power generator 61 and of the sun panels 62.

The method for cyclically managing the supplying system is implemented as a computer program mainly in the controller 20. The controller 20 automatically maintains the continuity of the electrical supply of the equipment 5 and of the members included in the unit 2, provides the charge of the batteries 31 by the intermittent source 6 or by the electrochemical generating unit 4, stocking electrical power in the batteries 31 when the intermittent source 6 produces an excess electrical power, and preferably monitors the system 1 retransmitting signals of operation and alarm state by the telecommunications station making up the equipment 5.

The outlet terminals of the wind power generator 61 are connected respectively by two state first switches 21 to the inlets of the converters 22 for converting the intermittent currents in outlet of the wind power generator 61 into a direct current under a nominal continuous voltage of 48V.

The outlet terminals of the photovoltaic sun panels 62 are connected respectively by first inlets of four state second switches 23 to the inlets of the converters 24 so as to convert the intermittent currents in outlet of the panels 62 into a direct current under the nominal continuous voltage. The outlets of the hydrogen cells 40 in the units 4 are connected respectively by second inlets of two of the switches 23 to the inlets of converters 24 for converting the variable direct current in outlet of the hydrogen cells into direct current under the nominal continuous voltage.

The switches 21 and 23 have their states controlled by the controller 20. At a first state of the switches 21 and 23, the wind power generator 61 and the sun panels 62 supply the equipment 5 and optionally charge one or the two batteries 31, or supply the electrolysis facilities 41 so as to produce hydrogen, during a period of sufficient wind and sunlight. At a second state of said two switches 23, the hydrogen cells 40 rapidly recharge the batteries 31, while maintaining the supply of the equipment 5. Each converter 22, 24 comprises an electronic adaptor for adapting to variable currents and voltages at their inlets and a outlet voltage stabilizer. Each converter 22, 24 measures its outlet current and is controlled by the central controller 20 as a function of the outlet current measured for instance for varying the outlet voltage applied by the bus 26 to the batteries 31 until a full charge voltage upon charging the batteries. The controller 20 thus establishes powers at the outlets of the converters and evaluates on the one hand the outlet powers of the wind power generator 61 and of the photovoltaic sun panels 62 and thus the outlet power P6 of the power source 6, and on the other hand, the outlet powers of the hydrogen cells 40 and therefore, the outlet power P4 of the electrochemical generating units 4.

According to a more secured alternative, the switches 21, 22 may comprise additional states for connecting second outlets of the switches to an emergency converter 2S intended to be replaced by one defective of the converters 22, 24 under the control of the central controller 20. For instance, a converter is defective if its outlet power is abnormally low during a period of strong wind or big sunlight. To this end, the controller 20 is connected to an anemometer and to a photometer (not shown) for measuring and monitoring the force of the wind and the light flow on the site of the system 1.

The central controller 20 by means of the charge regulators included in the converters 22 and 24 controls in voltage the charge of the batteries 31. According to the embodiment as shown on FIG. 1, a relay circuit 27 connected across the batteries 31 is controlled by the controller 20 so as to protect the batteries 31 from any overcharge and any deep discharge while maintaining the charge of the batteries between the discharge power P3m and the full charge power P3M, and ensure a high current for recharging the batteries by the source 6 or the cells 40. Alternatively, the relay circuit is omitted and the batteries themselves comprise an electronic unit ensuring the protection from any overcharge and any deep discharge.

The charge controller 25 is connected across the batteries 31 and transmits the charge power P3, that is the voltages and the currents measured across the batteries 31, to the central controller 20. Alternatively, the charge controller 25 is integrated into the electronic unit included in the batteries.

The central controller 20 also controls the solenoid valve 46EV and the fan 43V and the solenoid valves 48EV and 49EV respectively upon the operation of the cells 40 and the operation of the electrolysis facilities 41 during the managing method as being described hereinafter. The controller 20 is also connected to various measuring devices AM (not shown) such as an anemometer, a photometer, a flowmeter, a manometer, a thermometer, for monitoring the operations of the intermittent electric power source 6 and each electrochemical generating unit 4.

Figure 2:
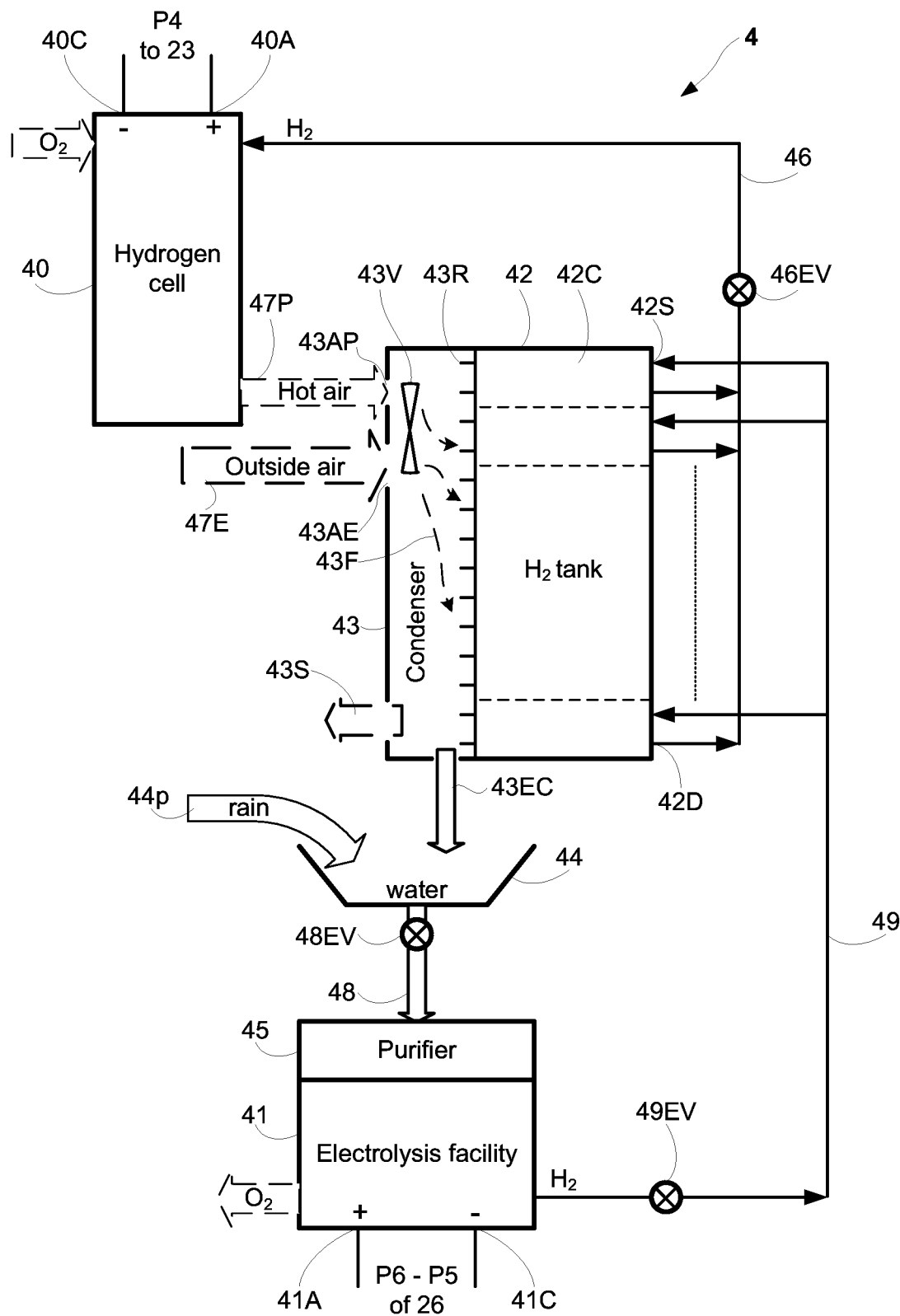
FIG. 2 is a schematic block-diagram of a gaseous fuel electrochemical generating unit include in the system.

As is obvious from the previous description of FIGS. 1 and 2, the electrical supplying system 1 of the invention may be changed into several compact, little bulky and connectable modules and be thereby able to be transported in a helicopter in order to be installed in isolated places or hardly accessible places or during missions for rescuing populations after natural disasters or upon conflicts. Moreover, the system is designed to have a 15 year lifetime, with only a yearly maintenance.

The cyclic managing method for electrical supply according to this invention is based on the observation that a hydrogen cell 40 and a battery 31 have very different lifetimes and operating characteristics. Typically, the lithium-ion batteries 31 have a lifetime being longer than approximately 15 years and can withstand at least 7000 charge-discharge cycles between the powers P3$m$ and P3M, the difference of which accounts for approximately 60% of the difference between a deep discharge and an overcharge of the batteries. A hydrogen cell 40 is adapted to supply an electrical power ranging between a minimum power and a maximum power and has a lifetime of approximately 5000 hours, whatever the electrical power it delivers; for instance under a voltage of 48V, the electric current supplied by the cell ranges between 20 A and 100 A. The lifetime of the hydrogen cell, being independent from the power it delivers, is dependent on the number of activation-deactivation of the latter being higher than approximately 1000.

In order to save the hydrogen cells 40 and thereby postpone as much as possible making use of the activation of the cells, the cells are only activated when the batteries are quite discharged and reach their discharge threshold P3$m$, and the cells never supply directly the electrical power P5 necessary for the operation of the equipment 5 when the batteries are charged or are being discharged. Otherwise stated, the electrical continuity of the supply of the equipment 5 is preserved under the control of the controller 20 in priority by the intermittent electrical power source 6 if the latter supplies enough electrical power for operating the equipment 5, or by the electric power stocking module 3 and the source 6 if the source 6 supplies insufficient electrical power for operating alone the equipment 5, or only by the electric power stocking module 3 if the source 6 no longer supplies electrical power and the power available in the batteries has not reached the discharge power P3$m$. As a last resort, when the discharge power P3$m$ of the batteries is reached, the hydrogen cells 40 are activated so as to produce their maximum power and both very rapidly charge the batteries 31 up to the full charge power P3M and ensure the electrical power necessary for the operation of the equipment 5. The lithium-ion batteries 31 are very rapidly recharged, within approximately three hours, as compared to other batteries for instance lead-acid batteries requiring a recharging duration of approximately 10 hours. As soon as the batteries are charged, the hydrogen cells 40 are deactivated and the batteries 31 slowly discharging optionally ensure with the source 6 the supply of the equipment 5. The accumulated duration of the activation of the cells 40 is thereby decreased as long as the batteries are able to implement alone or with the source 6 the operation of the equipment 5.

For instance in order to permanently supply a direct charge current of 20 A to the equipment 5 with batteries 31 having a capacity of 480 Ahr and discharge and full charge powers P3$m$ and P3M corresponding to minimum and maximum currents of 240 A and 480 A, that is a duration of discharge and autonomy of (480−240)/20=12 hr, the hydrogen cells 40 having a maximum power P4 corresponding to a maximum current of 100 A distributed in a current of 20 A for the equipment and a current of 100-20=80 A for the charge of the batteries charge the batteries for 240/80=3 h, corresponding to a discharge/charge cycle of 12+3=15 hr. Assuming cells are used 111 times a year, the lifetime of the electric supplying system 1 is 5000/(111×3)=15 years for cells having a lifetime higher than approximately half a year.

Figure 3:
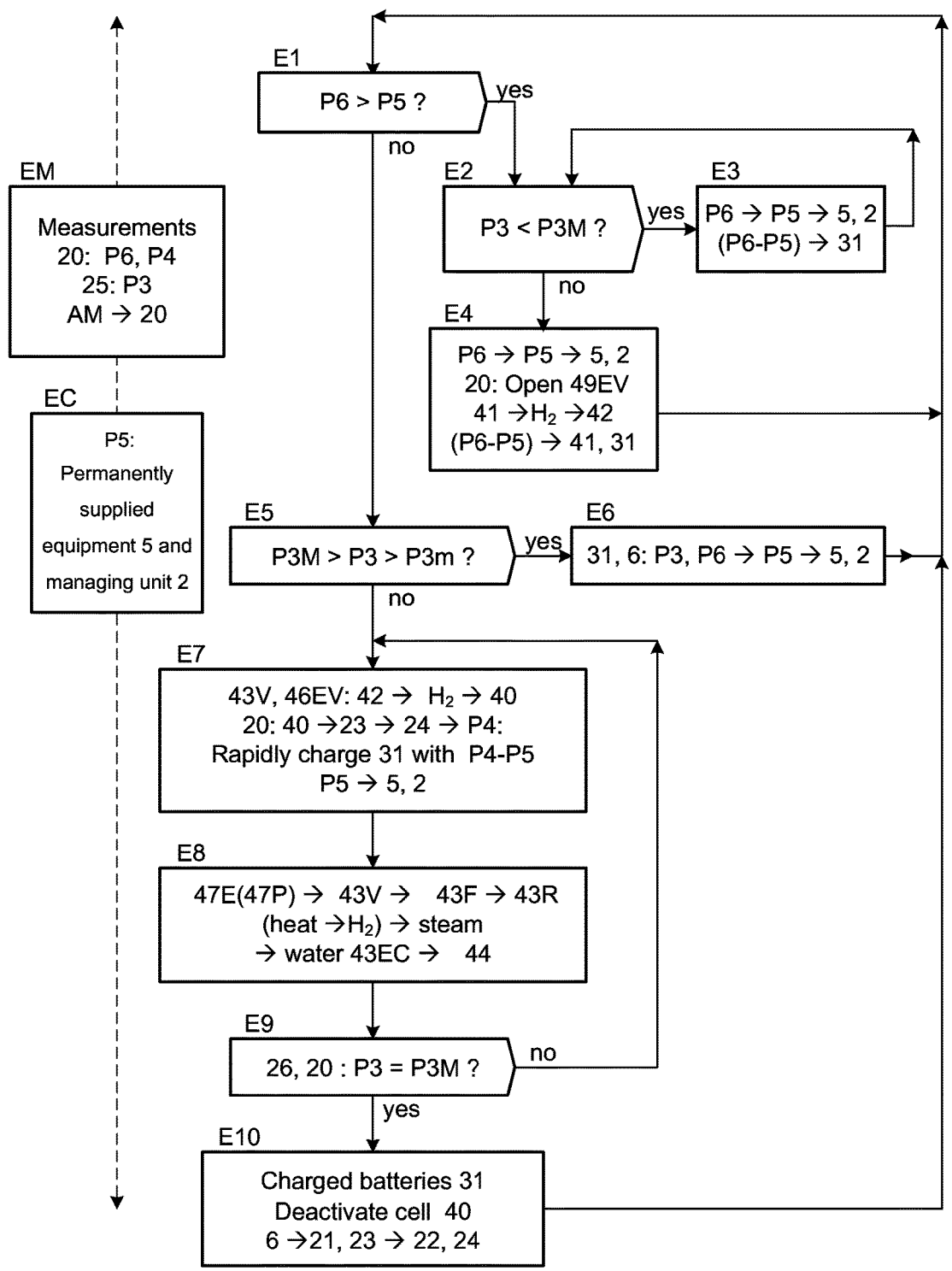
FIG. 3 is an algorithm of the method for managing the electrical supplying according to this invention.

With reference now to FIG. 3, the method of cyclic managing according to this invention comprises steps E1 to E10 mainly carried out in the controller 20. Initially upon the installation of the system 1, the batteries 31 are fully charged and as soon as the system is started, the intermittent electric power source 6 is connected to the electric equipment 5 via switches 21 and 23 and converters 22 and 24 and supply the power necessary for the operation of the equipment 5 with or without the contribution of the batteries 31.

As set forth, in a permanent measuring step EM, the central controller 20 evaluates the electrical power P62 supplied by the sun panels 62 or P4 supplied by the cells 40 as a function of the current measured in input of the converters 24 and the electrical power P61 supplied by the wind power generator 61 as a function of the number of the revolutions of the rotor of the latter, and hence the electrical power P6=P61+P62 supplied by the source 6. The controller 20 controls the supplying voltage V41 of the electrolysis facilities 41 varying as a function of the available power supplied by the intermittent source 6 for producing hydrogen upon the charge of the batteries. The controller 20 permanently evaluates the available power and the current consumed by the equipment 5 and the batteries 31 and thereby the power P5 necessary for the operation of the equipment 5 and the unit 2 and the power P3 of the batteries via the charge controller 25 so as to control the voltage ramp of the electrolysis facilities 41 upon the charge of the batteries. The controller 20 permanently receives measurements of physical magnitudes from the measurement devices AM.

The equipment 5 and the managing unit 2 receive permanently the electrical powers necessary to their operations through the outlets of the converters 22 and 24 through the bus 26, as set forth in a step of continuity for electrical supply EC. Said necessary electrical powers are globally referred to hereinafter as the charge power P5 permanently measured by the regulator 25 and notified by the latter to the controller 20. Permanently means that the measurements are carried out in a very short period of the order of a few tenths of a second.

At step E1, the controller 20 compares the measured electrical power P6 supplied by the intermittent source 6 to the charge power P5. If the power P6 exceeds the charge power P5, as a result of a period with much wind and/or sunlight, during which the source 6 supplies a high power, the controller 20 evaluates the excess available power P6-P5 for allotting it to the charge of the batteries or to the production of hydrogen. At step E2, the controller 20 compares the power P3 of the batteries 31 at their full charge power P3M. If P3<P3M, the equipment 5 and the unit 2 exhibiting a lower impedance than that of the batteries, the electrical power P6 supplied by the intermittent source 6 is used in priority for supplying the equipment 5 and the unit 2 and the batteries 31 accumulate the excess electrical power P6-P5 supplied by the source 6 until the batteries reach their full charge power P3M, at step E3. In the opposite case to step E2 where the batteries have their full charge power P3M, the controller 20 controls the supplying voltage V41 of the electrolysis facilities 41 so that the excess power P6-P5 is also used for supplying the electrolysis facilities 41 so that their cathodes 41C produce hydrogen stocked in the stocking tanks 42 at step E4. In such a case, the controller 20 also controls the opening of the solenoid valves 49EV as long as the hydrogen being produced is to be stocked in the tanks 42 via the lines 49.

Turning back to step E1, if the measured power P6 supplied by the source 6 is not enough, even nil, for supplying the equipment 5 and the unit 2 with the required charge power P5, the controller 20 compares the power P3 of the batteries 31 to their discharge threshold P3$m$, or according to the alternative, recovers the measured power P3 transmitted by the electronic unit included at step E5. If the charge P3 of the batteries is not enough, the equipment 5 and the unit 2 are supplied with the power supplied by the source 6 to which that extracted from the batteries 31 is added, at step E6. During the previous steps E1 to E6, the equipment 5 and the unit 2 are thereby supplied by the source 6 and/or the batteries 31 as long as the power P3 of the batteries remains higher than the discharge threshold P3$m$.

If at step E5 the batteries 31 are discharged after a period of low wind and sunlight, even a lack of wind and light, corresponding to P3=P3$m$, the controller 20 starts the fans 43V and controls the opening of the solenoid valves 46EV so that the tanks 42 destock hydrogen toward the anodes 40A of the cells 40 via the lines 46 and the cells are activated at step E7. The controller 20 controls the switches 23 for connecting the outlet of the hydrogen cells 40 to the converters 24 so that the converters very rapidly charge the batteries 31 via the bus 26 with the excess P4-P5 of the electrical power produced by the cells until the full charge power P3M. The power P5 necessary for the operation of the equipment 5 and of the unit 2 is extracted from the power P4 generated by the cells 40 absorbing an amount of hydrogen varying as a function of the current consumption of the batteries and of the equipment 5.

At step E8 simultaneous to step E7, the operating fans 43V force the outside air 47E to flow on the radiators 43R in the condensers 43. The radiators 43R capture the heat of the ventilated outside air 47E and transfer it to the hydride in the boxes 42C of the stocking tanks 42 during the endothermic desorption converting the hydride into an alloy and hydrogen so as to destock the hydrogen necessary to the operation of the cells 40. The heat exchange via the radiators 43R condenses the steam of the outside air 47E into condensation water 43EC being collected in tanks-collectors 44. According to the above mentioned alternative, the steam in the hot air 47P evolved by the operating hydrogen cells 40 is also condensed into water 43EC. Simultaneously to steps E7 and E8, the controller 20 monitors the progress of the recharge of the batteries 31 notified by the charge controller 25, or the electronic unit included in the batteries, at step E9.

As soon as the batteries 31 have reached their full charge power P3M at step E9, the controller 20 stops the fan 43V and closes the solenoid valves 46EV, deactivating the cells 40, and controls the switches 23 for connecting the outlets of the sun panels 62 to the converters 24, at step E10. After step E10, similarly to after steps E4 and E6, the controller 40 goes back afterwards to step E1 of the method so that the equipment 5 and the unit 2 are supplied in priority by the intermittent source 6 at steps E2 to E4 or by at least the batteries 31 at step E6.

According to an alternative of step E7, the controller 20 also controls the switches 21 disconnecting the wind power generator 61 and the converters 22 until the batteries 31 reach the full charge power P3M.

According to a second use, the intermittent power source 6 is a local electrical power distribution network replacing the wind power generator 61 and the sun panels 62, and the system 1 acts as an emergency electric generator should the local electric network become defective. For this second use, the electric network is connected to the converters 22 and/or 24 through the switches 21 and/or 23. The converters are configured by the controller 20. The method of managing the electrical supply of the electrical equipment 5 and of the managing unit 2 is similar to that described hereinabove. At steps E1 to E4, as long as the electric network supplies electrical power, the equipment 5 and the managing unit 2 are supplied by the electric network being operable, if necessary, for producing hydrogen by the electrolysis facilities 41 at step E4. As soon as the electric network is switched off, the batteries 31 relay the network at step E6. If switching off the network occurs until the power P3 of the batteries reaches the discharge threshold P3$m$ at step E5, the batteries are recharged through activation of the cells 40 at steps E7 to E10.

The failure of the local electric network may result from a more or less frequent failure, but also to damage to the network resulting from a natural disaster, such as a storm, an earthquake or a tsunami.

When the electric equipment 5 is a telecommunications station, the station the electrical supply of which is managed by the managing unit 2 ensures without discontinuity communications with mobile terminals whatever the state of the intermittent source 6 during more than about ten consecutive days. For instance, the mobile terminals are those of professional groups for public security services, being organized in terrestrial radio-communications networks. If the telecommunications station is installed in an isolated site, for instance on the top of a hardly accessible mountain, the managing unit 2 according to this invention allows to maintain the operation of the station for several consecutive days when the intermittent source does not produce or does not produce enough electrical power for the equipment. In particular, when the intermittent source is an electric distribution network, the system 1 enables to postpone by a few days the involvement of a maintenance team for repairing the damaged network.

According to other applications, the electric equipment 5 is an electric motor, such as for instance a pump for extracting water from a well, or a monitoring system.

The invention being described relates to a method and an electric supplying managing unit for ensuring the continuity of the electrical supply of an electric equipment material supplied in priority by an intermittent electric power source. According to an implementation, the steps of the method of the invention are determined by the instructions of a computer program incorporated into the managing unit, in particular in the controller 20 of the managing unit 2. The program able to be implemented in the managing unit of the invention comprises program instructions which, when said program is carried out in the managing unit the operation of which is then controlled through the program being carried out, achieve the steps of the method according to this invention.

Consequently, the invention also applies to a computer program, including a computer program recorded on or in a computer readable recording medium and any device for processing data, adapted for implementing the invention. This program may use any programming language and be in the form of a source code, an object code or an intermediary code between the source code and the object code such as in a partially compiled form or any other desired form for implementing the method according to this invention. The program may be downloaded in the base station via a communication network, such as internet.

The recording medium may be any entity or device able to stock the program. For example, the medium may comprise a stocking medium, on which the computer program according to this invention is recorded, such as a ROM, e.g. a CD ROM or a ROM of a microelectronic circuit or even a USB key or a magnetic recording medium, for example, a floppy disc or a hard drive.

The invention claimed is:

1. A method for managing the continuity of the electrical supply of an electric equipment, the method comprising:
   supplying power by an intermittent electric power source to the electrical equipment, an electric power stocking module and a gaseous fuel electrochemical generating unit for producing and stocking fuel when both power of the electric power source exceeds an operating power of the equipment and also when power of the electric power stocking module is at a first power threshold comprising a full charge threshold,
   destocking the fuel in the electrochemical generating unit, supplying power by the electrochemical generating unit to the electrical equipment and charging the electric power stocking module by the electrochemical generating unit as soon as the power of the electric power stocking module is at a second power threshold comprising a discharge threshold and that is lower than the first power threshold and until the power of the electric power stocking module charged by the electrochemical generating unit reaches the first power threshold;
   supplying power to the equipment by the intermittent electric power source and charging the electric power stocking module by the intermittent electric power source when the power of the intermittent electric power source exceeds the operation power of the equipment and the power of the electric power stocking module ranges between the first and second power thresholds, and
   supplying power to the equipment by at least the electric power stocking module when the power of the intermittent electric power source is lower than the operating power of the equipment and the power of the electric power stocking module ranges between the first and second power thresholds.

2. The method according to claim 1, further comprising supplying a unit for managing a supply of power to the electrochemical generating unit as a function of a charge of the electric power stocking module, simultaneously with a supply of power to the equipment.

3. The method according to claim 1, further comprising:
   in the electrochemical generating unit, generating fuel by an electrolysis facility and stocking the fuel in a stocking tank when the electrolysis facility is supplied by the electric power source, and
   in the electrochemical generating unit, destocking the fuel from the stocking tank in a fuel cell in response to the power of the electric power stocking module reaching the second power threshold and until the power of the electric power stocking module supplied by the cell reaches the first power threshold.

4. The method according to claim 1, wherein the fuel is hydrogen.

5. The method according to claim 4, further comprising condensing steam from air into condensation water during the destocking of hydrogen.

6. The method according to claim 5, wherein the stocking of hydrogen comprises an adsorption of hydrogen by an alloy so as to form a hydride, and the wherein condensation results in a transfer of heat of the air charged with steam to an endothermic reaction of the hydride into an alloy.

7. A managing unit for managing continuity of the supply of power to electric equipment comprising:
   a means for supplying by the electric power source power to the equipment, an electric power stocking module and an electrochemical generating unit so as to produce and stock fuel in the electrochemical generating unit when the electric power source provides power exceeding an operating power of the equipment and also when a power of the electric power stocking module is at least at a first power threshold comprising a full charge threshold, and
   a means for destocking fuel in the electrochemical generating unit, supplying power to the equipment by the electrochemical generating unit and charging the electric power stocking module by the electrochemical generating unit as soon as the electric power stocking module is able to have a power equal to a second power threshold comprising a discharge threshold and that is lower than the first threshold and until the electric power stocking module charged by the electrochemical generating unit is able to reach the first power threshold;
   the electrochemical generating unit supplying power to the equipment and the electric power stocking module as soon as the electric power stocking module is able to have a power being equal to the second power threshold and until the electric power stocking module charged by the electrochemical generating unit is able to reach the first power threshold, and so that at least the electric power stocking module is able to supply the equipment when the electric power source is able to have a power that is lower than the operating power of the equipment and the electric power stocking module is able to have a power ranging between the first and second power thresholds.

8. The managing unit according to claim 7, further comprising switches connected to the electric power source and to the electrochemical generating unit, current converters connected to the electric power stocking module, to the equipment and to the electrochemical generating unit, and a controlling means able to control the switches and the converters so as to supply the power to the equipment and the electric power stocking module as soon as the electric power stocking module is able to have a power being equal to the second power threshold and until the electric power stocking module charged by the electrochemical generating unit is able to reach the first power threshold, and so that at least the electric power stocking module is able to supply the equipment when the electric power source is able to have a power that is lower than the operating power of the equipment and the electric power stocking module is able to have a power ranging between the first and second power thresholds.

9. The system according to claim 7 wherein the electric power source is a renewable energy source.

10. The system according to claim 7 wherein the electric power source is an electric power distribution network.

11. The system according to claim 9, wherein the electrochemical generating unit comprises:
a fuel cell for supplying the equipment and charging the electric power stocking module as soon as the electric power stocking module is able to have a power that is equal to the second power threshold and until the electric power stocking module charged by the electrochemical generating unit is able to reach the first power threshold,
an electrolysis facility for producing fuel when the source is able to have a power exceeding the operating power of the equipment and when the electric power stocking module is able to have a power that is at least equal to the first power threshold, and
a stocking tank for stocking fuel produced by the electrolysis facility and destocking fuel in the fuel cell.

12. The system according to claim 11, wherein the fuel is hydrogen.

13. The system according to claim 12, wherein the electrochemical generating unit comprises:
a condenser for condensing the steam from outside air into condensation water during a destocking of hydrogen from the stocking tank in the cell; and,
a water tank-collector for collecting the condensation water during the destocking of hydrogen and supplying the condensation water to the electrolysis facility when the electrolysis facility is able to be supplied by the electric power source.

14. The system according to claim 13, wherein the condenser is configured to condense steam supplied by the cell.

15. A computer program stored on a non-transitory recording medium being implemented in a managing unit for managing the continuity of the supply of an electric equipment, said program comprising instructions which, when the program is carried out in a processor of the managing unit, implements the steps of:
supplying power by an intermittent electric power source to the electrical equipment, an electric power stocking module and a gaseous fuel electrochemical generating unit for producing and stocking fuel when both power of the electric power source exceeds an operation power of the equipment and also when power of the electric power stocking module is at a first power threshold comprising a full charge threshold,
destocking the fuel in the electrochemical generating unit, supplying power by the electrochemical generating unit to the electrical equipment and charging the electric power stocking module by the electrochemical generating unit as soon as the power of the electric power stocking module is at a second power threshold comprising a discharge threshold and that is lower than the first power threshold and until the power of the electric power stocking module charged by the electrochemical generating unit reaches the first power threshold;
supplying power to the equipment by the intermittent electric power source and charging the electric power stocking module by the intermittent electric power source when the power of the intermittent electric power source exceeds the operation power of the equipment and the power of the electric power stocking module ranges between the first and second power thresholds, and
supplying power to the equipment by at least the electric power stocking module when the power of the intermittent electric power source is lower than the operating power of the equipment and the power of the electric power stocking module ranges between the first and second power thresholds.

* * * * *